(12) United States Patent
Maekawa et al.

(10) Patent No.: US 9,887,650 B2
(45) Date of Patent: Feb. 6, 2018

(54) INVERTER DEVICE AND POWER STEERING DEVICE

(71) Applicants: KABUSHIKI KAISHA TOSHIBA, Minato-ku (JP); NSK Ltd., Shinagawa-ku (JP)

(72) Inventors: Sari Maekawa, Minato-ku (JP); Shin Kumagai, Shinagawa-ku (JP); Shigeru Fukinuki, Shinagawa-ku (JP); Minoru Awazu, Shinagawa-ku (JP)

(73) Assignees: KABUSHIKI KAISHA TOSHIBA, Minato-ku (JP); NSK Ltd., Shinagawa-ku (JP)

( * ) Notice: Subject to any disclaimer, the term of this patent is extended or adjusted under 35 U.S.C. 154(b) by 69 days.

(21) Appl. No.: 14/383,668

(22) PCT Filed: Mar. 12, 2013

(86) PCT No.: PCT/JP2013/056786
§ 371 (c)(1),
(2) Date: Sep. 8, 2014

(87) PCT Pub. No.: WO2013/137244
PCT Pub. Date: Sep. 19, 2013

(65) Prior Publication Data
US 2015/0035464 A1    Feb. 5, 2015

(30) Foreign Application Priority Data

Mar. 16, 2012 (JP) .................................. 2012-060307

(51) Int. Cl.
*H02H 7/08* (2006.01)
*H02P 6/12* (2006.01)
(Continued)

(52) U.S. Cl.
CPC .............. *H02P 6/12* (2013.01); *B62D 5/0463* (2013.01); *B62D 5/0487* (2013.01);
(Continued)

(58) Field of Classification Search
USPC .............. 318/400.21, 400.25, 400.17, 400.2, 318/400.26, 801, 803
See application file for complete search history.

(56) References Cited

U.S. PATENT DOCUMENTS 5,706,183 A    1/1998    Abe et al.
8,278,896 B2 *  10/2012   Horii ..................... H02M 3/158
                                                        323/271

FOREIGN PATENT DOCUMENTS

JP      6-261402        9/1994
JP      06-261402 A  *  9/1994
(Continued)

OTHER PUBLICATIONS

Office Action issued Nov. 4, 2014 in Japanese Patent Application No. 2012-060307 (with English language translation).
(Continued)

*Primary Examiner* — Eduardo Colon Santana
*Assistant Examiner* — Iftekhar Mustafa
(74) *Attorney, Agent, or Firm* — Oblon, McClelland, Maier & Neustadt, L.L.P.

(57) ABSTRACT

An inverter device includes a switch circuit configured by series-connecting two N-channel semiconductor switching elements in opposite directions so that the switch circuit makes or breaks electrical connection between a DC power supply and an inverter circuit, and a control circuit carrying out a protecting operation in which when the control circuit outputs a control signal to control switching of the inverter circuit and an operating condition is met, the control circuit stops output of the control signal to turn off all switching
(Continued)

elements configuring the inverter circuit and the switch circuit. In the protecting operation, the switch circuit is turned off after output of the control signal has been stopped so that changes in drain-source voltages and drain currents of the N-channel semiconductor switching elements are rendered slower.

3 Claims, 12 Drawing Sheets

(51) Int. Cl.
*H02M 7/5387* (2007.01)
*B62D 5/04* (2006.01)
*H02P 6/24* (2006.01)
*H02H 7/122* (2006.01)
*H02M 1/32* (2007.01)
*H02H 3/08* (2006.01)

(52) U.S. Cl.
CPC .......... *H02H 7/122* (2013.01); *H02M 7/5387* (2013.01); *H02P 6/24* (2013.01); *H02H 3/08* (2013.01); *H02M 1/32* (2013.01)

(56) References Cited

FOREIGN PATENT DOCUMENTS

| JP | 8-80042 | | 3/1996 |
|----|---------|---|--------|
| JP | 08-080042 A | * | 3/1996 |
| JP | 10-167085 | | 6/1998 |
| JP | 10-167085 A | * | 6/1998 |
| JP | 10167085 A | * | 6/1998 |
| JP | 2008-072865 | * | 3/2008 |
| JP | 2008-72865 | | 3/2008 |
| JP | 2010-45946 | | 2/2010 |

OTHER PUBLICATIONS

International Search Report issued Jun. 18, 2013, in PCT/JP13/056786 filed Mar. 12, 2013.
Notification of Submission of Argument issued Feb. 17, 2016 in Korean Patent Application No. 10-2014-7027910 (with English language translation).
Combined Chinese Office Action and Search Report issued Feb. 25, 2016 in Patent Application No. 201380014554.0 (with English language translation and English translation of categories of cited documents).
International Search Report dated Jun. 18, 2013, in PCT/JP13/056786 filed Mar. 12, 2013.

* cited by examiner

INVERTER DEVICE AND POWER STEERING DEVICE

BACKGROUND

1. Technical Field

Embodiments described herein relate to an inverter device including a switch circuit configured by series-connecting two N-channel semiconductor switching elements in opposite directions so that the switch circuit makes or breaks electrical connection between a DC power supply and an inverter circuit, and a power steering device provided with the inverter device.

2. Related Art

An electrically driven power steering device includes a steering torque sensor detecting input steering torque supplied via a handle manipulated by a driver and a control device determining the magnitude and direction of motor output based on an output signal of the steering torque sensor. An electric motor is driven via an inverter circuit, so that power of the motor is transmitted to a steering system thereby to reduce the steering torque.

In conventional electrically driven power steering devices, a switch configured by a relay is inserted between a battery as a power supply and the inverter circuit. When detecting an overcurrent state or malfunction of PWM control, the control device opens the switch to cut off electrical power supply to the inverter circuit and the motor, thereby preventing the motor from producing an undesired assist steering force. However, the switch configured by the relay is required to supply a large current of about several tens of amperes to 100 amperes to the motor in order that the assist steering torque may be generated. A relay which can interrupt such a large current as mentioned above is large in size, resulting in a large-sized power steering device. In view of the circumstances, a switch circuit using a semiconductor switching element such as FET instead of the relay has been proposed.

SUMMARY OF THE INVENTION

FIG. 11 shows an example of configuration assumed in this case. An inverter circuit 1 includes six power MOSFETs (N-channel) 2 (U to W, X to Z) connected into a three-phase bridge configuration. The inverter circuit 1 has respective phase output terminals to which phase windings (not shown) of an electric motor 3 are connected. The motor 3 is a brushless DC motor, for example. A battery 4 of a vehicle has a positive-side terminal connected via a switch circuit 5 to a positive-side DC bus bar of the inverter circuit 1 and a negative-side terminal (body ground) connected to a negative-side DC bus bar.

The switch circuit 5 includes two N-channel MOSFETs 6a and 6b configured by connecting respective sources to each other. The N-channel MOSFET 6a has a drain connected to a positive-side terminal of the battery 4. The N-channel MOSFET 6b has a drain connected to a positive-side DC bus bar of the inverter circuit 1. The N-channel MOSFETs 6a and 6b have respective gates connected to each other. A resistance element 7 is connected between the gates and sources.

A drive circuit 8 driving the switch circuit 5 is configured as a peripheral circuit such as MCU (micro control circuit) as an IC. Electrical power is supplied from the battery 4 via a diode 15 to the drive circuit 8. A circuit ground is connected to the negative DC bus bar of the inverter circuit 1. A power supply generation circuit 9 generating drive power to drive the switch circuit 5 has an output terminal. A series circuit of two N-channel MOSFETs 10 and 11 is connected between the output terminal of the power supply generation circuit 9 and the ground. Drive signals output by the above-mentioned MCU are supplied via a half bridge (H/B) drive circuit 12 to gates of the MOSFETs 10 and 11 individually. Further, protecting diodes 13 and 14 are connected in parallel to the N-channel MOSFETs 10 and 11 respectively.

The common connection points (sources and drains) of the MOSFETs 10 and 11 are connected to the gates of the N-channel MOSFETs 6a and 6b composing the switch circuit 5. When the switch circuit 5 is to be turned on according to a drive signal from the MCU, the H/B drive circuit 12 turns on the N-channel MOSFET 10 and turns off the N-channel MOSFET 11 thereby to turn gate potentials of the N-channel MOSFETs 6a and 6b to the high level. Further, when the switch circuit 5 is to be turned off, the H/B drive circuit 12 turns off the N-channel MOSFET 10 and turns on the N-channel MOSFET 11 thereby to turn gate potentials of the N-channel MOSFETs 6a and 6b to the low level.

When the power MOSFET 2 composing the inverter circuit 1 short-circuits, there is a possibility that an overcurrent would flow from the battery 4 into the inverter circuit 1 side regarding a device mounted in a vehicle and receiving power supply from the battery 4. In order that the above-mentioned condition may be avoided, the N-channel MOSFETs 6a and 6b need to be quickly turned off for interruption of current. In this case, when the current flowing before turn-off of the N-channel MOSFETs 6a and 6b is large, changes of drain-source voltage Vds and drain current Id of each of the N-channel MOSFETs 6a and 6b become rapid, with the result that there is a possibility of deflection of the drain-source voltage Vds and drain current Id from a safe operation area of each N-channel MOSFET.

For example, FIG. 12 denotes a safe operation area of a MOSFET used in a vehicle-mounted electronic device by a solid line and a voltage-current characteristic in the case where the turn-off timing of each of the N-channel MOSFETs 6a and 6b is faster than the stop timing of the inverter circuit 1. White dots represent the MOSFET 6a and black dots represent the MOSFET 6b. As shown in this figure, the drain-source voltages partially deflect from the safe operation area with the result that there is a possibility of breaking of the MOSFETs 6a and 6b.

In view of the foregoing, an object is to provide an inverter device and a power steering device each of which can safely turn off the switch circuit comprised of MOSFETs even when a short-circuit current flows into the inverter circuit.

According to one embodiment, an inverter device is provided with a switch circuit configured by series-connecting two N-channel semiconductor switching elements in opposite directions so that the switch circuit makes or breaks electrical connection between a DC power supply and an inverter circuit. The inverter device comprises a control circuit carrying out a protecting operation in which when the control circuit outputs a control signal to control switching of the inverter circuit and an operating condition is met, the control circuit stops output of the control signal to turn off all switching elements configuring the inverter circuit and the switch circuit. The inverter device also comprises switch drive circuits connected between the control circuit and the switch circuit to output on-off control signals individually to the respective two N-channel semiconductor elements configuring the switch circuit. In the protecting operation, when the control circuit outputs the on-off control signals to turn off the switch circuit after having stopped output of the control signal, the control circuit turns off a first one of the two N-channel semiconductor switching elements. The one element has a parasitic diode with a cathode located at a power supply side. The control circuit thereafter turns off the element having a parasitic diode with an anode located at a power supply side so that changes in drain-source voltages and drain currents of the N-channel semiconductor switching elements are rendered slower.

Further, according to the embodiment, a power steering device includes an electric motor generating an assist steering force assisting a steering force of a vehicle steering and an inverter device and controlling the motor.

According to the inverter device of the embodiment, changes in voltage between conductive terminals of the N-channel semiconductor switching elements and in an electrical current flowing between the terminals are rendered slower, so that the drain-source voltages and drain currents can be prevented from deviating from the safe operation area of the switching elements.

DETAILED DESCRIPTION

First Embodiment

Figure 3:
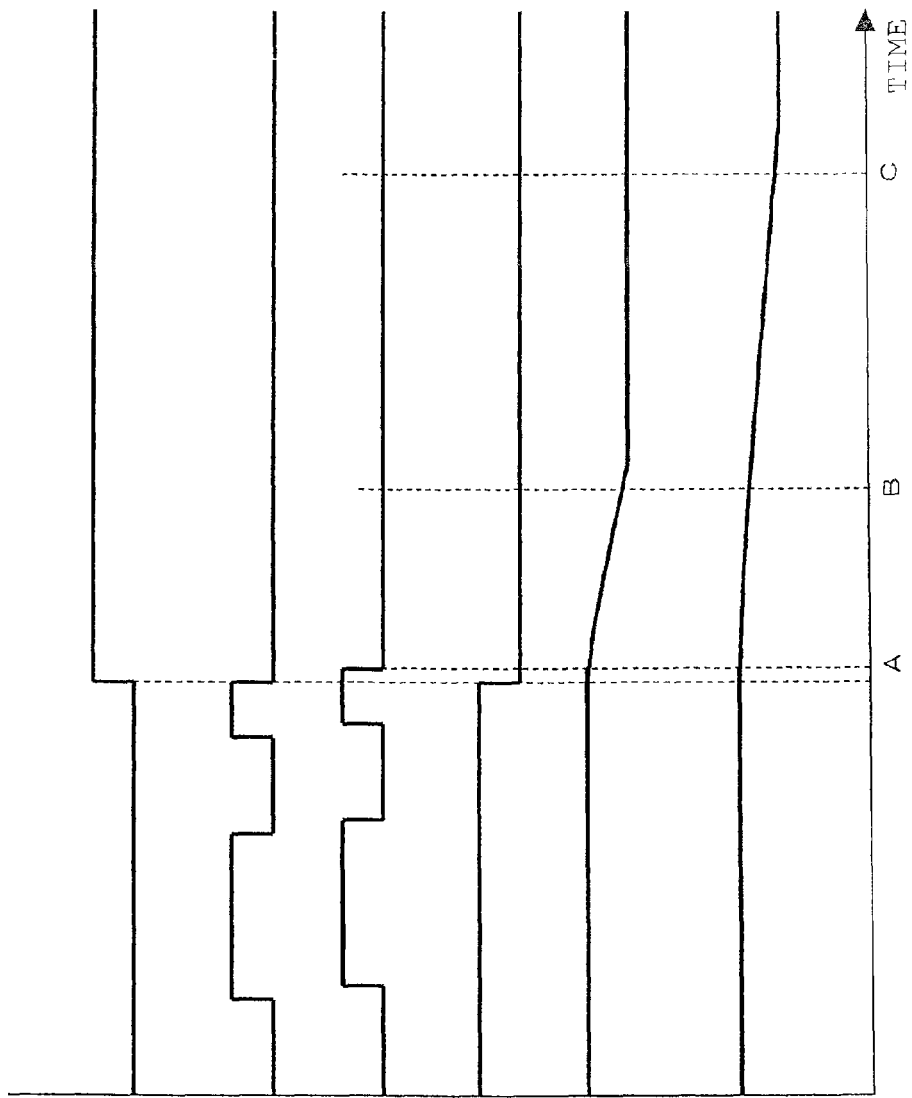
FIG. 3 is a timing chart showing signal waveforms in the case where MCU carries out a protecting operation.
Figure 4:
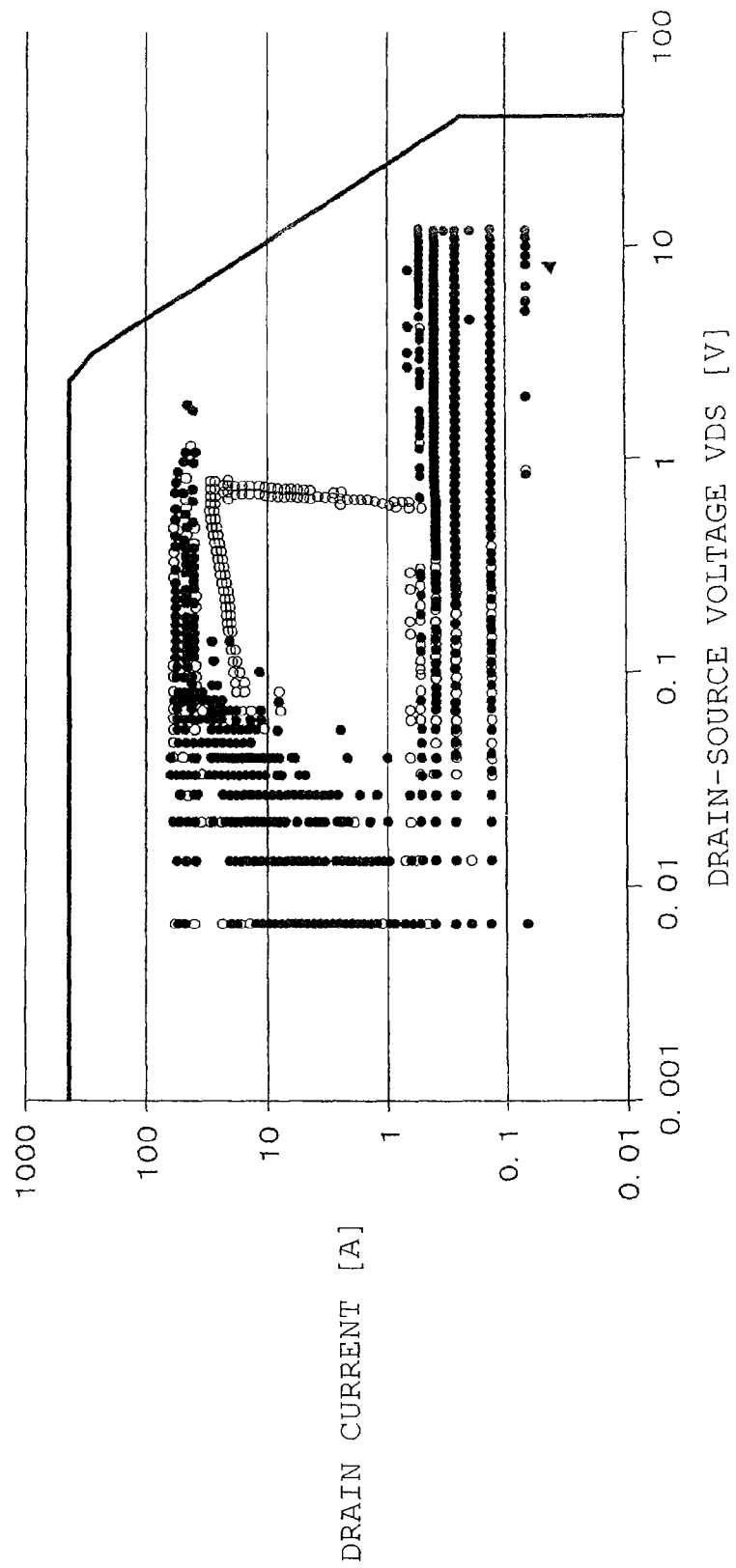
FIG. 4 is a graph showing a safe operation area of MOSFET.
Figure 5:
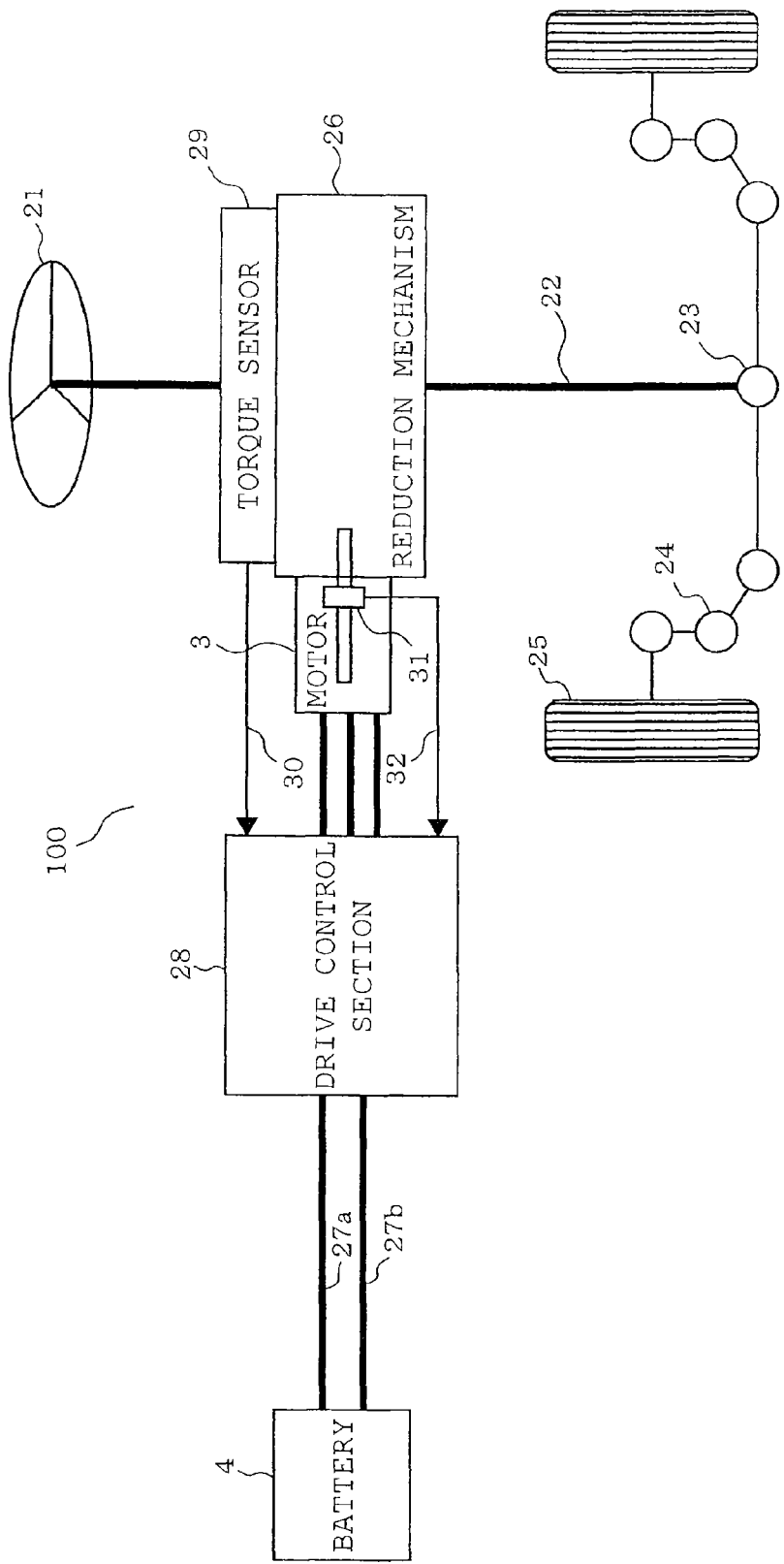
FIG. 5 is a schematic view showing the construction of an entire power steering device.

A first embodiment will be described with reference to FIGS. 1 to 5. Identical or similar parts are labeled by the same reference symbols as those in FIG. 11 and the description of these similar parts will be eliminated in the first embodiment. Only the differences will be described in the following. FIG. 5 shows an overall arrangement of a power steering device 100. A steering shaft 22 has an end fixed to a steering handle 21 disposed in a vehicle compartment. A rotative force of the steering shaft 22 is transmitted by a rack and pinion mechanism 23 as a force changing the direction of wheels 25 mounted via connecting mechanism 24 to ends of rack shafts respectively. A three-phase brushless DC motor 3 is mounted on the steering shaft 22 to assist rotation of the steering shaft 22. The motor 3 is connected via a reduction mechanism 26 to the shaft 22.

Power supply voltage of the battery 4 is supplied through wires 27a and 27b to a motor drive control 28. The motor drive control 28 is adjacent to or is attached firmly to the motor 3 to control energization of the motor 3 in a PWM manner. A torque sensor 29 detects torque applied to the steering shaft 22. A resolver 31 detects a rotational position of the motor 3. A signal line 30 of the torque sensor 29 and a signal line 32 of the resolver 31 are connected to the motor drive control 28.

Figure 2:
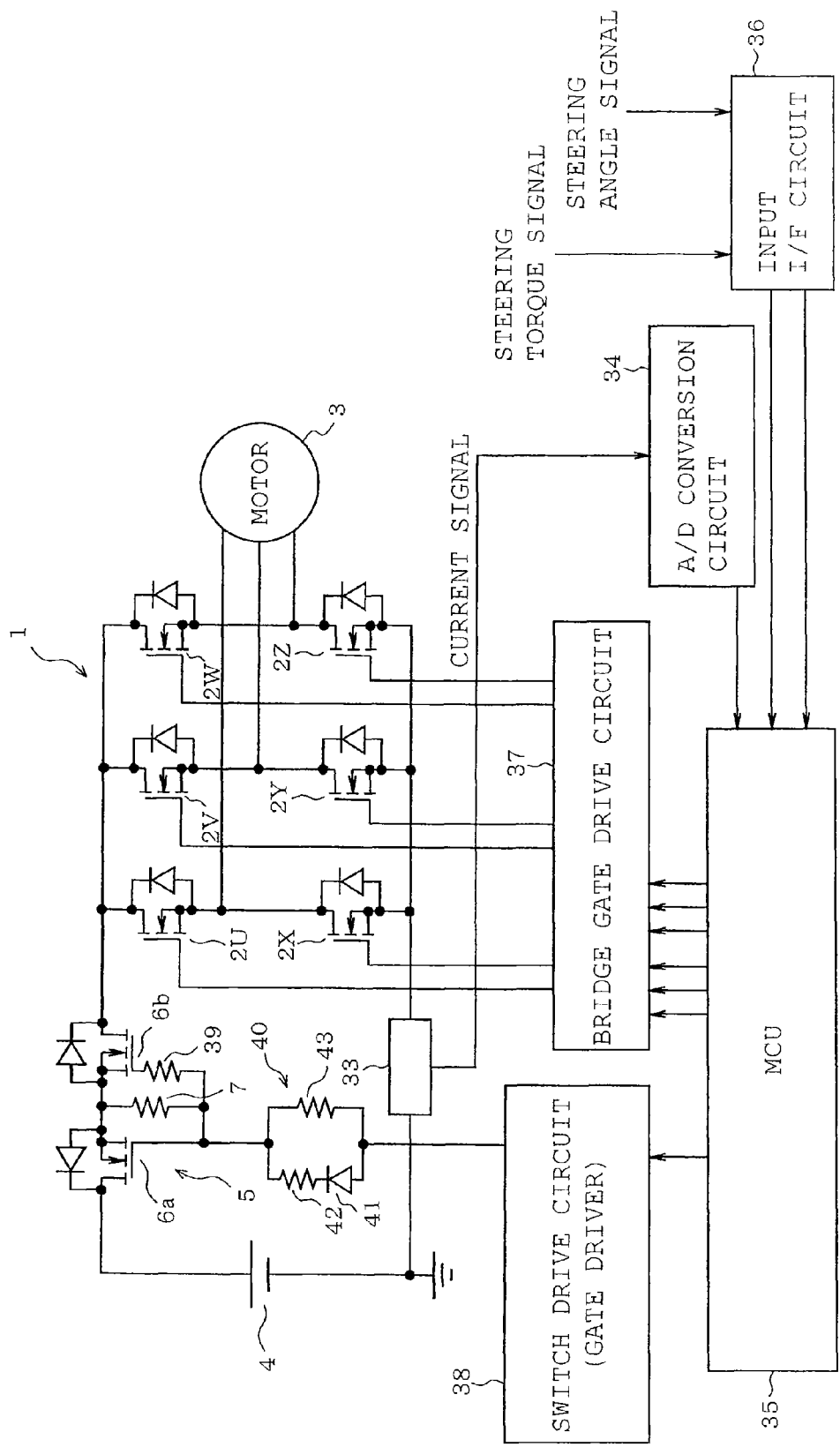
FIG. 2 is a function block diagram showing an inner arrangement of a motor drive control.

FIG. 2 is a function block diagram showing an internal arrangement of the motor drive control 28. A current detector 33 (a resistance element, for example and serving as a current detection unit) is connected between a negative terminal (a reference potential point) of the battery 4 and the negative DC bus bar of the inverter circuit 1. A current signal obtained by the current detector 33 is supplied to an A/D conversion circuit 34. A current probe which detects a magnetic field generated by electrical current thereby to detect the current may be used as the current detection circuit 33. The A/D conversion circuit 34 obtains data by A/D conversion of an input current signal and outputs the data to an MCU 35 (a control circuit).

A steering angle signal is supplied from the torque sensor 29 to an input I/F (interface) circuit 36 and a steering angle signal is also supplied from the resolver 31 to the input I/F circuit 36. The input I/F circuit 36 inputs voltage signals according to the respective input signals to the MCU 35. The MCU 35 is configured of a microcomputer and the like and generates three-phase PWM signals (switching control signals) for controlling the FETs 2U to 2W and 2X to 2Z composing the inverter circuit 1 according to the input signals thereby to output the three-phase PWM signals to a bridge gate drive circuit 37. Further, the MCU 35 outputs a drive signal (on-off control signal) via a switch drive circuit 38 to the switch circuit 5. When an ignition switch (not shown) of the vehicle is turned on, power is supplied from the battery 4 to these circuits.

A resistance element 39 is inserted to the gate of the N-channel MOSFET 6b composing the switch circuit 5. Further, an on-off time adjusting circuit 40 (a resistance value changing unit) is connected between the switch drive circuit 38 and the gates of the N-channel MOSFETs 6a and 6b. The on-off time adjusting circuit 40 includes a series circuit of a forward-biased diode 41 and a resistance element 42, and a resistance element 43 connected in parallel to the series circuit. As a result, when the diode 41 is turned on, the resistance elements 42 and 43 become parallel to each other, so that a resistance value is rendered lower in a signal path in the case where the switch circuit 5 is turned on. On the other hand, a signal path in the case where the switch circuit 5 is turned off includes only a path extending via the resistance element 43, so that a resistance value is rendered higher in a signal path in the case where the switch circuit 5 is turned off.

Upon power supply, the MCU 35 firstly outputs a cut-off instruction (OFF) signal to the switch circuit 5. Upon end of an initializing process, the MCU 35 outputs a closing (ON) signal to the switch circuit 5. As a result, power of the battery 4 is supplied to the inverter circuit 1. The MCU 35 loads a steering torque signal and a steering rotational speed to determine whether or not a steering assist force (torque) needs to be supplied from the motor 3. When the steering assist force needs to be supplied, the MCU 35 obtains a rotating direction of the motor 3 and a steering assist force supplied from the motor 3 based on steering torque and steering rotational speed, generating and delivering PWM signals based on the obtained rotating direction and steering assist force.

The bridge gate drive circuit 37 includes a booster circuit (not shown) generating gate supply voltages to control the upper arm side FETs 2U to 2W composing the inverter circuit 1 so that the FETs 2U to 2W are in a conductive state. The bridge gate drive circuit 37 also includes a plurality of level shift circuits (not shown). The gate drive circuit 37 supplies gate voltage signals to the respective gates of the FETs 2, based on the PWM signals delivered from the MCU 35. The MCU 35 monitors current flowing in the inverter circuit 1 based on a current signal detected by the current detector 33. When the current flowing in the inverter circuit 1 exceeds a predetermined allowable current with the result that an operating condition is met, the MCU 35 stops drive of the motor 3 and cuts off energization of the switch circuit 5, thereby carrying out a protecting operation of cutting off power supply to the inverter circuit 1.

Figure 1:
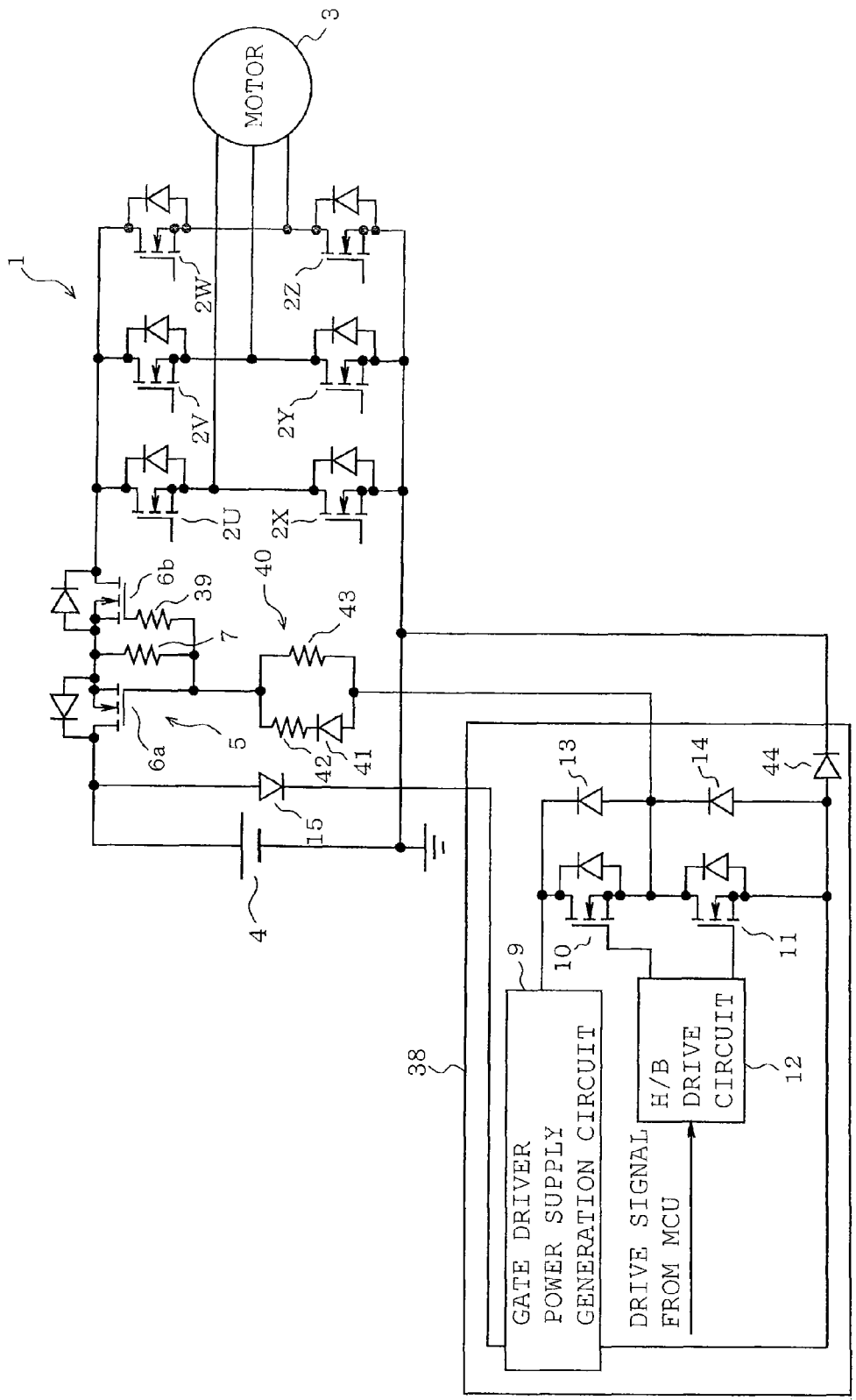
FIG. 1 is a view showing an inner arrangement of a switch drive circuit of a first embodiment.
Figure 11:
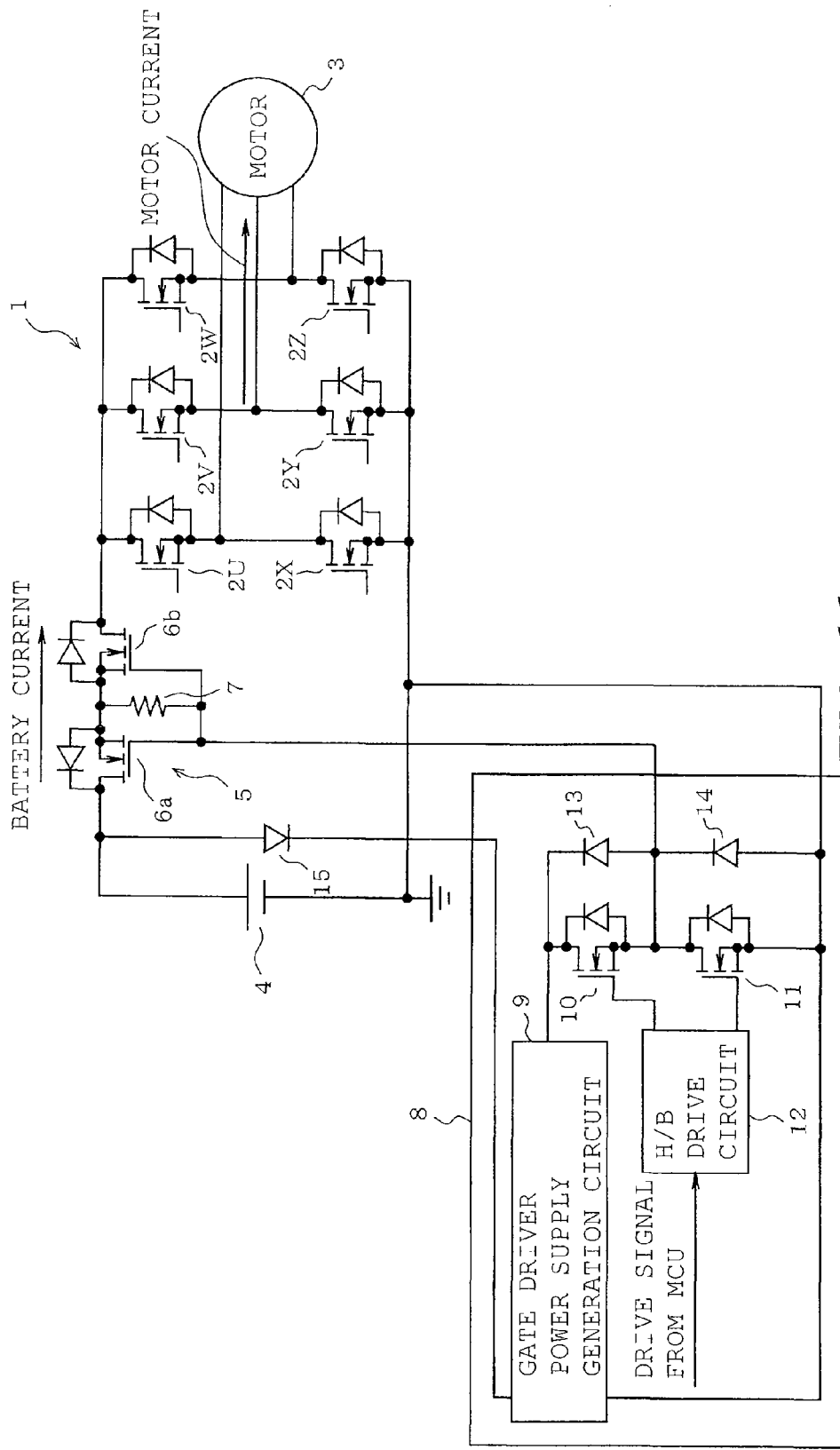
FIG. 11 is a view similar to FIG. 1, showing a related art.

FIG. 1 is similar to FIG. 11, showing an internal arrangement of the switch drive circuit 38. The drive circuit 8 shown in FIG. 11 has a circuit ground directly connected to the negative side DC bus bar of the inverter circuit 1. On the other hand, a forward-biased diode 44 (a current blocking diode) is connected between the circuit ground and the negative side DC bus bar. Consequently, even when the battery 4 is connected in reverse polarity, current flows through the switch drive circuit 38 with the result that an overcurrent is prevented from flowing via the on-state FET 6b and a parasitic diode of the FET 6a to the switch circuit 5.

The operation of the embodiment will now be described with reference to FIGS. 3 and 4. FIG. 3 is a timing chart showing signal waveforms in the case where the MCU 35 carries out the above-described protecting operation. Part (a) of FIG. 3 shows a protection signal used in the MCU 35 and the protection signal is turned to high level when an overcurrent has been detected. The MCU 35 then stops output of the PWM signals (see parts (b) and (c) of FIG. 3), and a power cut-off signal is output to the gate drive circuit 38 with the drive signal being turned to the low level (see part (d) of FIG. 3).

The aforementioned power cut-off signal is output via the on-off time adjusting circuit 40 to the gates of the N-channel MOSFETs 6a and 6b composing the switch circuit 5. In this case, each gate is in a high-level state in which a gate capacitance is charged. When electrical charge is discharged in the direction of the output terminal of the switch drive circuit 38, each gate transfers from the high-level state to a low-level state, with the result that the switch circuit 5 is turned off. In this case, since the signal path is formed via the resistance element 43 as described above, a resistance value becomes higher than in the turn-on time signal path, so that the off-timing of the switch circuit 5 is delayed. Further, since the resistance element 39 is inserted into the gate, the off-timing of the N-channel MOSFET 6b is further delayed as compared with the off-timing of the N-channel MOSFET 6a.

Figure 12:
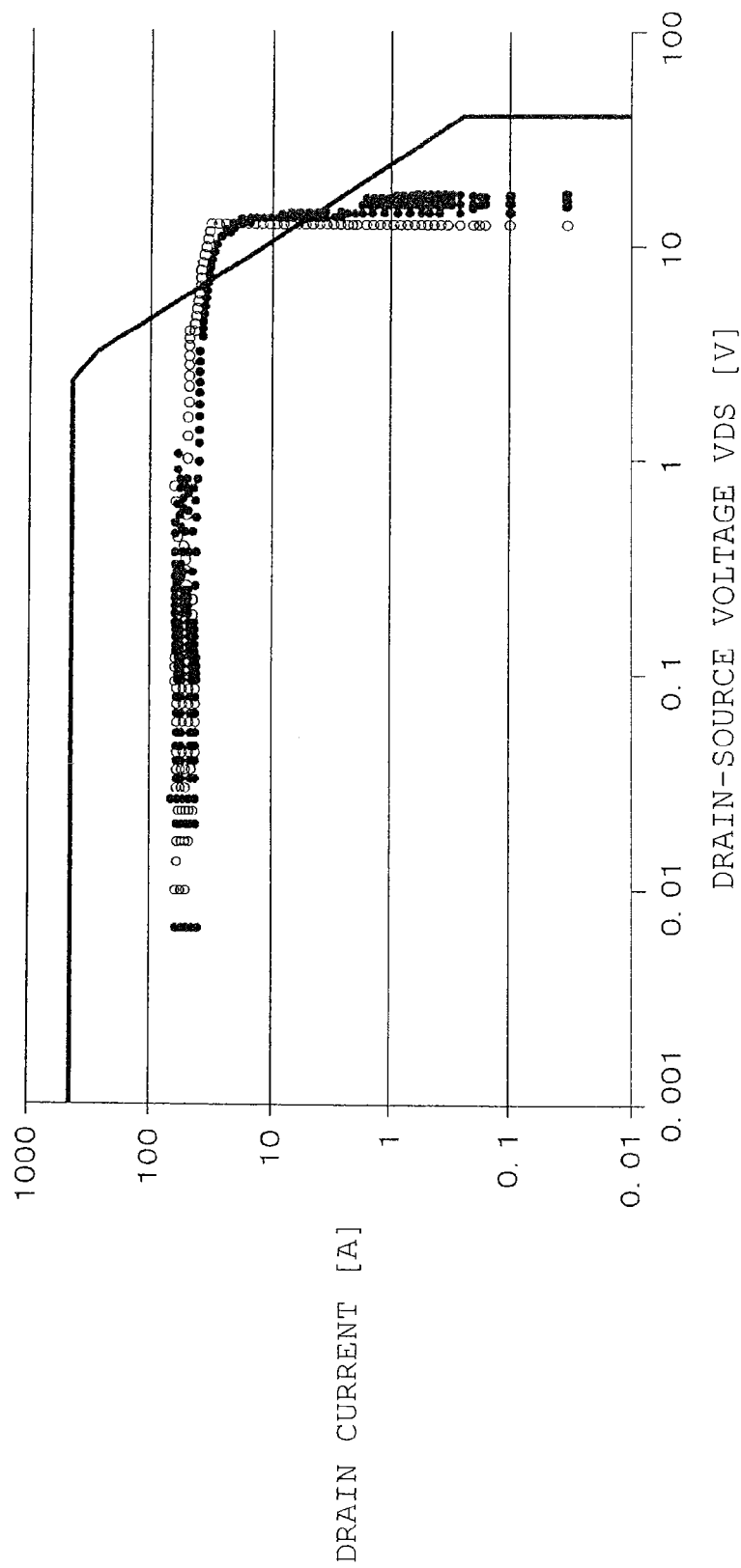
FIG. 12 is a view similar to FIG. 4.

Accordingly, as shown in parts (c), (e) and (f) of FIG. 3, a time point B at which the gate potential of the N-channel MOSFET 6a is reduced below the threshold voltage with the result that turn-off of the MOSFET is further delayed from a time point A at which all the power MOSFETs composing the inverter circuit 1 are turned off. Further, a time point C at which the gate potential of the N-channel MOSFET 6b is reduced below the threshold voltage with the result that turn-off of the MOSFET is delayed from the time point B. FIG. 4 is a view similar to FIG. 12 and shows that both MOSFETs 6a and 6b are operated within the safe operation area.

According to the embodiment, the switch circuit 5 configured by series-connecting two N-channel MOSFETs 6a and 6b (N-channel semiconductor switching elements) in opposite directions is disposed between the battery 4 and the inverter circuit 1. The switch drive circuit 38 outputs the on-off control signals to the switch circuit 5 while having the reference potential point common to the inverter circuit 1, thereby opening and closing the switch circuit 5.

The MCU 35 outputs the PWM signal to control switching of the inverter circuit 1. When the operating condition is met, the MCU 35 stops output of the control signal to turn off all the power MOSFETs composing the inverter circuit 1 and turns off the switch circuit 5, thereby carrying out the protecting operation. In the protecting operation, the MCU 35 turns off the switch circuit 5 after having stopped output of the PWM signals to the inverter circuit 1. Accordingly, changes in the drain-source voltages Vds and drain currents Id of the N-channel MOSFETs 6 are rendered slower, so that the drain-source voltages Vds and drain currents Id can be prevented from deviating from the safe operation area of the MOSFETs.

The on-off time adjusting circuit 40 is connected between the switch drive circuit 38 and the switch circuit 5 so that the resistance values of the signal path in the case where the switch circuit 5 is turned on and in the case where the switch circuit 5 is turned off are changed. More specifically, the on-off time adjusting circuit 40 is configured of the series circuit of the diode 41 and the resistance element 42, and the resistance element 43 connected in parallel to the series circuit. In other words, the signal paths at turn-on time and at turn-off time are changed by the diode 43, whereby the resistance values can be changed.

Further, the resistance element 39 is inserted into the gate of the N-channel MOSFET 6b, so that the gate resistance value is set to be larger at the N-channel MOSFET 6a side. When the switch circuit 5 is turned off, the N-channel MOSFET 6a is first turned off. More specifically, when the MOSFETs 2 composing the inverter circuit 1 are turned off while current is flowing into the motor 3, a large surge voltage is apt to be generated in the inverter circuit 1 by inductance of the motor 3 and the changes in the current. When no switch circuit 5 as in the embodiment is provided, the surge voltage is absorbed to the battery 4 side, with the result that there is no problem.

However, when the switch circuit 5 is provided as in the foregoing embodiment and the N-channel MOSFET 6b is first turned off upon occurrence of surge voltage, a path through which the current flows to the battery 4 side so that the surge voltage is absorbed, is cut off. Accordingly, the voltage of the inverter circuit 1 is rapidly increased with the result that there is a possibility of breaking of the MOSFETs 2. Further, the switch circuit 5 cannot be quickly turned off when the time at which N-channel MOSFETs 6a and 6b are turned off is delayed. Then, the N-channel MOSFET 6a is first turned off and the N-channel MOSFET 6b is subsequently turned off, so that the switch circuit 5 is turned off while a path through which surge voltage is absorbed to the battery 4 side upon occurrence of the surge voltage is ensured, with the result that the battery 4 and the inverter circuit 1 can be quickly disconnected from each other.

Further, the half bridge circuit including series-connected two N-channel MOSFETs 10 and 11 (semiconductor switching elements) is provided between the power supply generation circuit 9 and the reference potential point. Protective diodes 13 and 14 are connected in parallel to the FETs 10 and 11 respectively. The diode 44 is provided for blocking current flowing therethrough to the switch circuit 5 side.

Accordingly, the switch circuit 5 which is configured in a smaller size as compared with large power relays can be used, with the result that the power steering device 100 can be reduced in size. Further, even when the battery 4 is connected in reverse polarity, the parasitic diode of the FET 6a and the protecting diode 14 in the switch drive circuit 38 prevent reverse current flowing, so that the inverter circuit 1 and the motor 3 can be protected and failure due to short circuit can be prevented.

Second Embodiment

Figure 6:
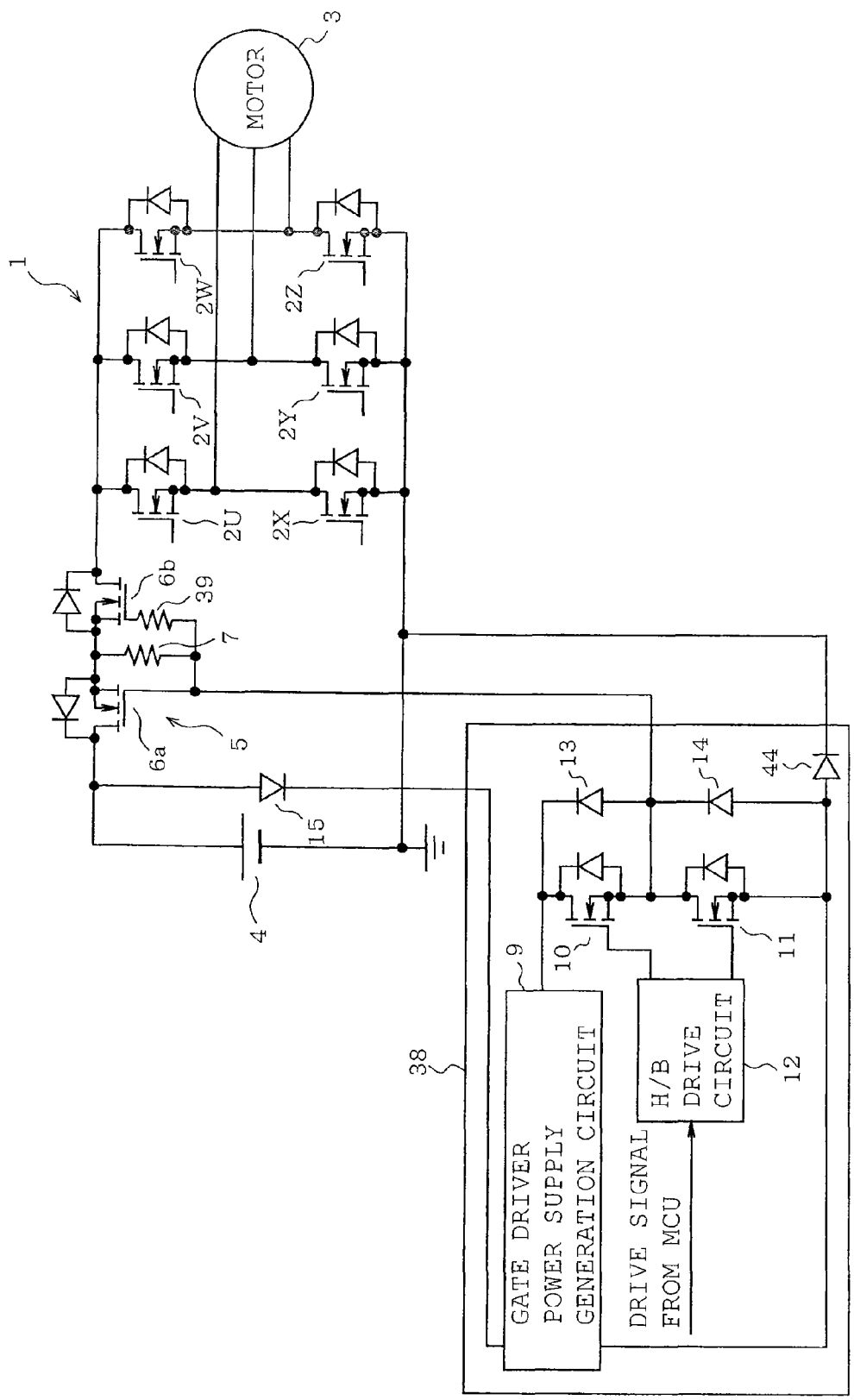
FIG. 6 is a view similar to FIG. 1, showing a second embodiment.
Figure 7:
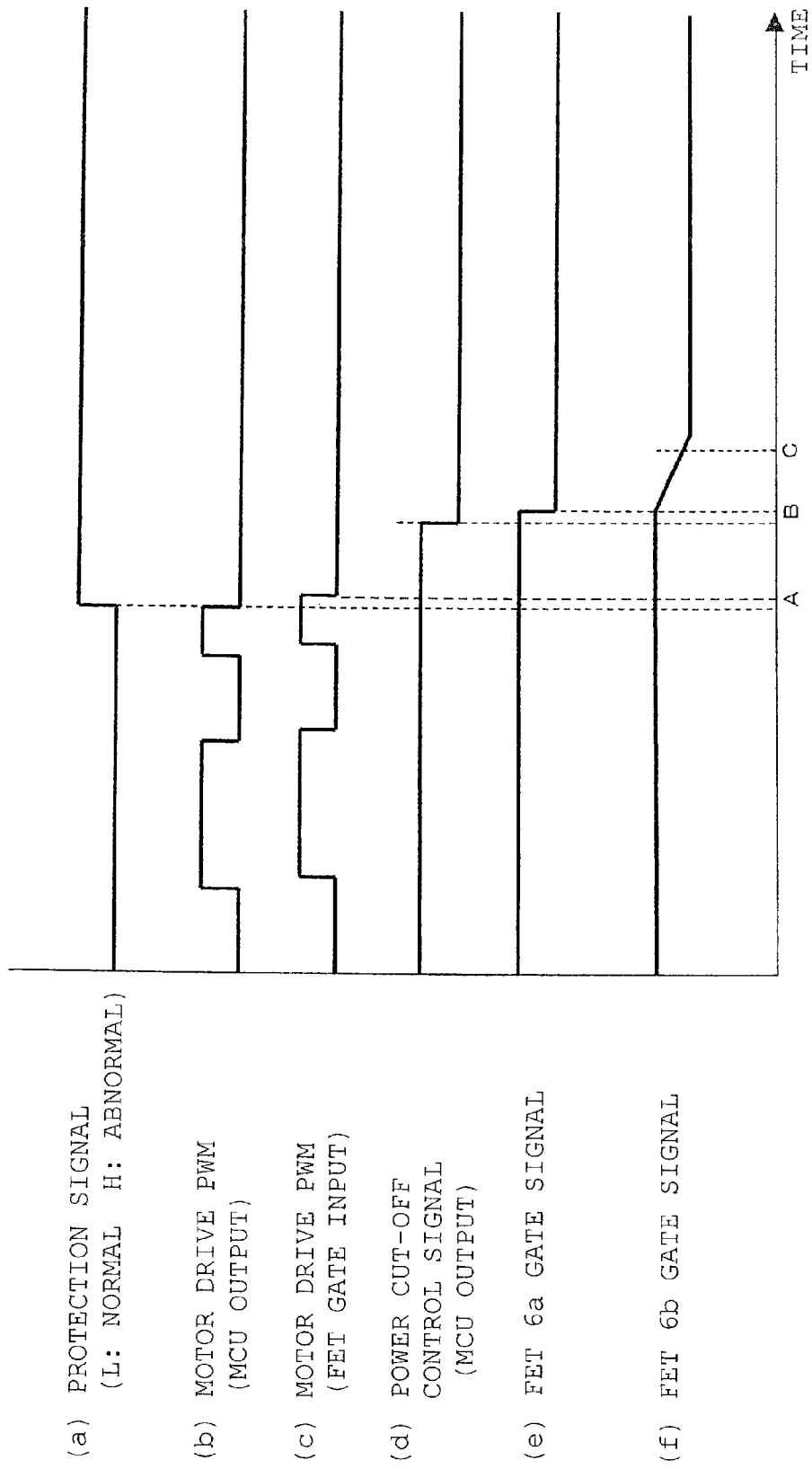
FIG. 7 is a view similar to FIG. 3.

FIGS. 6 and 7 illustrate a second embodiment. In the second embodiment, identical or similar parts are labeled by the same reference symbols as those in the first embodiment and the description of these identical parts will be eliminated. Only the differences between the first and second embodiments will be described in the following. When the protecting operation of turning off the switch circuit 5 after stop of PWM signal output to the inverter circuit 1 as in the first embodiment, the timing when the MCU 35 outputs a power cut-off signal is delayed relative to the timing when output of PWM signal to the inverter circuit 1 has been stopped. Accordingly, the on-off time adjusting circuit 40 is eliminated in FIG. 6.

The operation of the second embodiment will now be described with reference to FIG. 7. As shown in part (b) of FIG. 7, the MCU 35 firstly stops output of PWM signal and then outputs a power cut-off signal with a time delay as shown in part (c) of FIG. 7. The N-channel MOSFET 6a then turned off with delay relative to the aforesaid timing (see part (d) in FIG. 7) and the N-channel MOSFET 6b is turned off with further delay corresponding to a resistance value of the resistance element 39 (see part (e) in FIG. 7).

According to the above-described second embodiment, when carrying out the protecting operation, the MCU 35 delays the output timing of the power cut-off signal to the switch circuit 5 relative to the timing when output of PWM signal to the inverter circuit 1 has been stopped. As a result, the timing when the inverter circuit 1 is stopped and the timing when the switch circuit 5 is turned off can be adjusted by the control by the software of the MCU 35.

Third Embodiment

Figure 8:
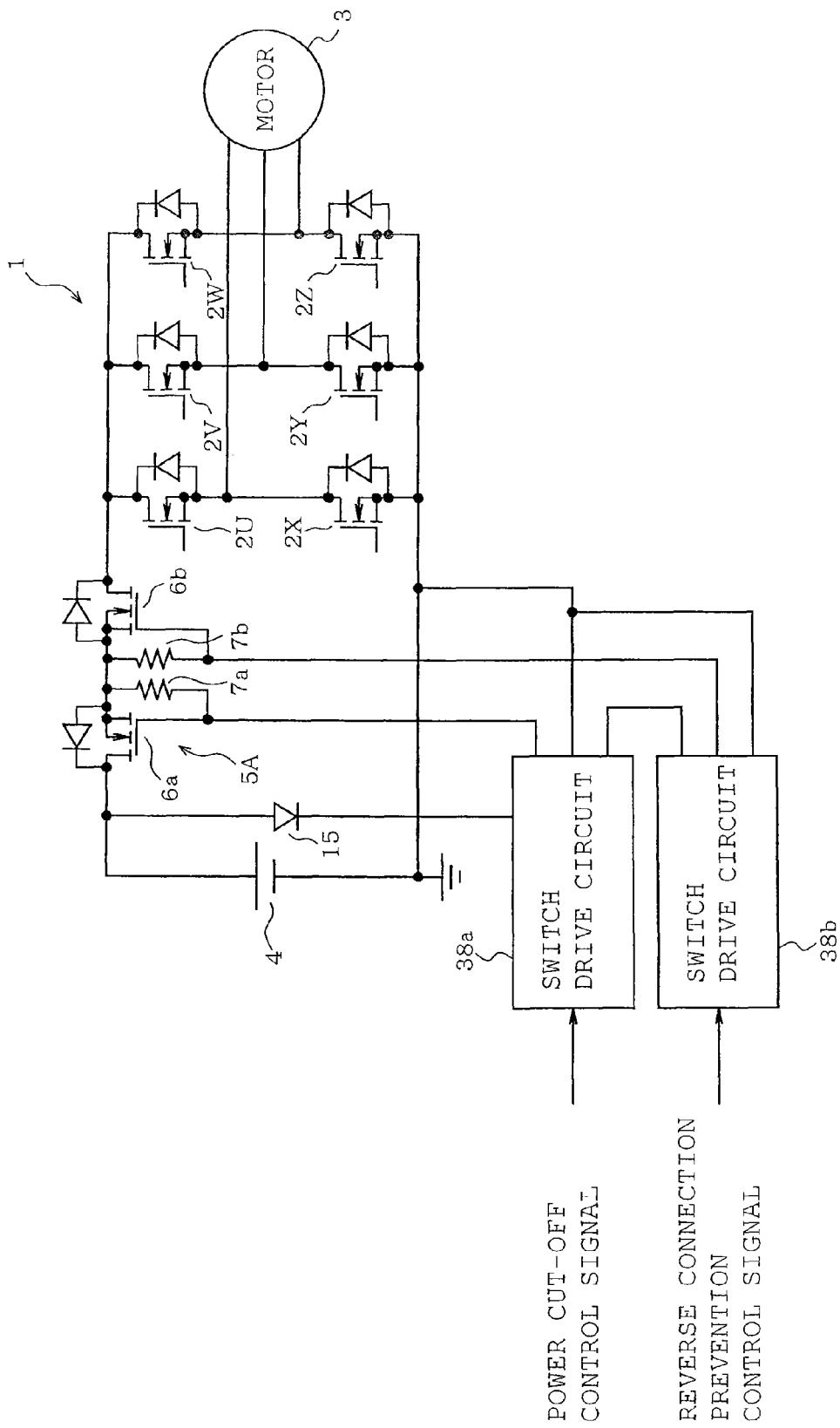
FIG. 8 is a view similar to FIG. 1, showing a third embodiment.
Figure 9:
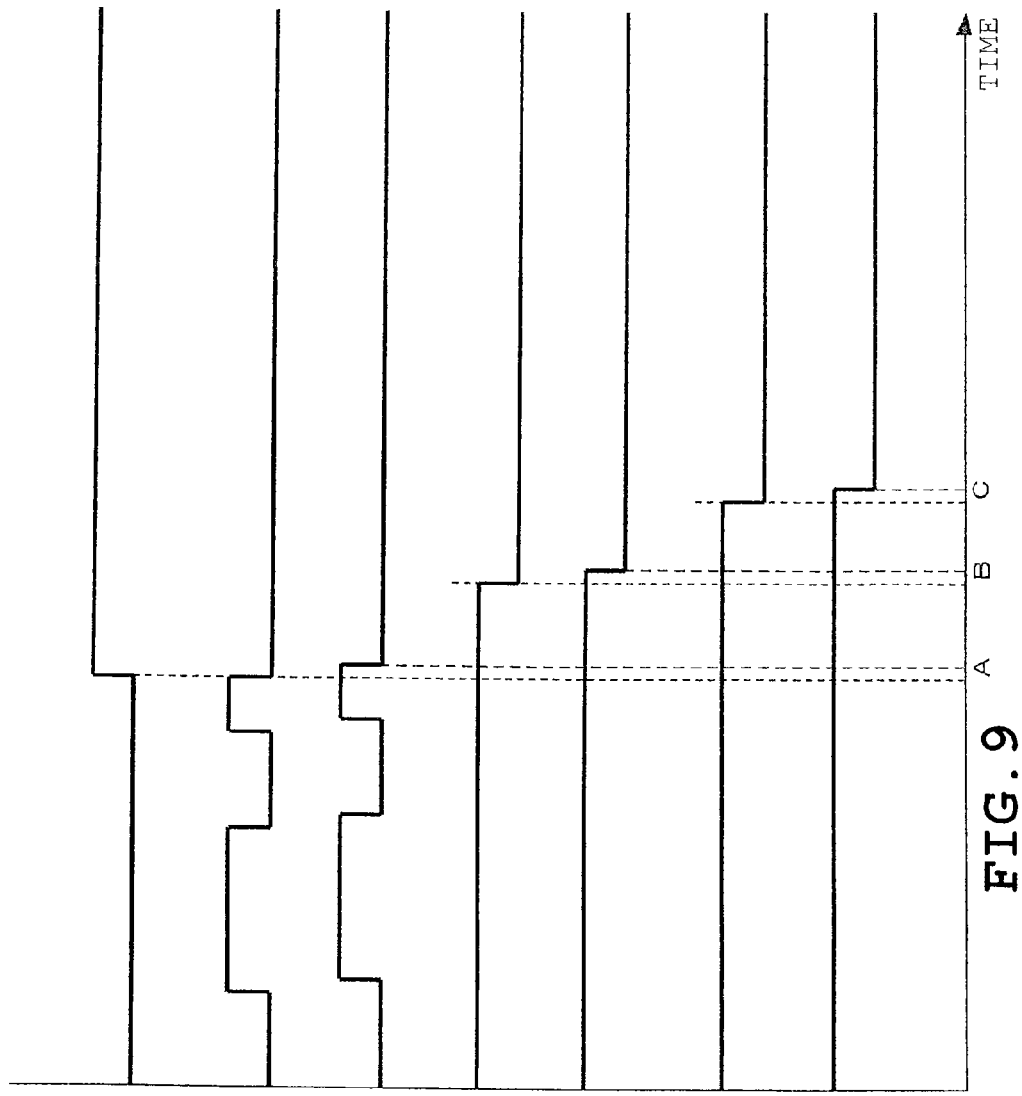
FIG. 9 is a view similar to FIG. 3.

FIGS. 8 and 9 illustrate a third embodiment. Differences between the second and third embodiments will be described. In the third embodiment, when carrying out the protecting operation, the MCU 35 controls the stop timing of the inverter circuit 1 and the turn-off timing of the switch circuit 5A as in the second embodiment. Regarding the switch circuit 5A, however, gate signals are output individually to the N-channel MOSFETs 6a and 6b.

Switch drive circuits 38a and 38b are provided so as to correspond to the N-channel MOSFETs 6a and 6b respectively, as shown in FIG. 8. The switch drive circuit 38a corresponds to the switch drive circuit 38 in the second embodiment. However, the switch drive circuit 38b is provided with no gate driver power supply generation circuit 9 and is supplied with gate driver power supply from the switch drive circuit 38a. The gates of the N-channel MOSFETs 6a and 6b are connected to output terminals of the switch drive circuits 38a and 38b respectively. Further, resistance elements 7a and 7b are connected between sources-gates of the N-channel MOSFETs 6a and 6b respectively, instead of the resistance element 7. The resistance element 39 is eliminated.

The operation of the third embodiment will be described with reference to FIG. 9. The MCU 35 stops output of PWM signal in first (see part (b) of FIG. 9) and then turns off the switch circuit 5A with time delay relative to the stop of output of PWM signal. In this case, the MCU 35 outputs the power cut-off signal (a first on-off control signal) so that the N-channel MOSFET 6a having the cathode of the parasitic diode serving as the power supply side is turned off in first (see parts (c) and (d) of FIG. 9). The MCU 35 then outputs a reverse connection prevention control signal (a second on-off control signal) to turn off the N-channel MOSFET 6b having the anode of the parasitic diode (see parts (e) and (f) of FIG. 9).

According to the third embodiment as described above, the switch drive circuits 38a and 38b are individually provided so as to correspond to the N-channel MOSFETs 6a and 6b respectively. After having stopped the inverter circuit 1, the MCU 35 outputs a control signal to turn off the N-channel MOSFET 6a and thereafter a control signal to turn off the N-channel MOSFET 6b. Accordingly, the turn-off timing of each of the N-channel MOSFETs 6a and 6b can be adjusted by the software control of the MCU 35, so that the N-channel MOSFET 6a is turned off in first with the result that current can be prevented from flowing to the inverter circuit 1 side.

Fourth Embodiment

Figure 10:
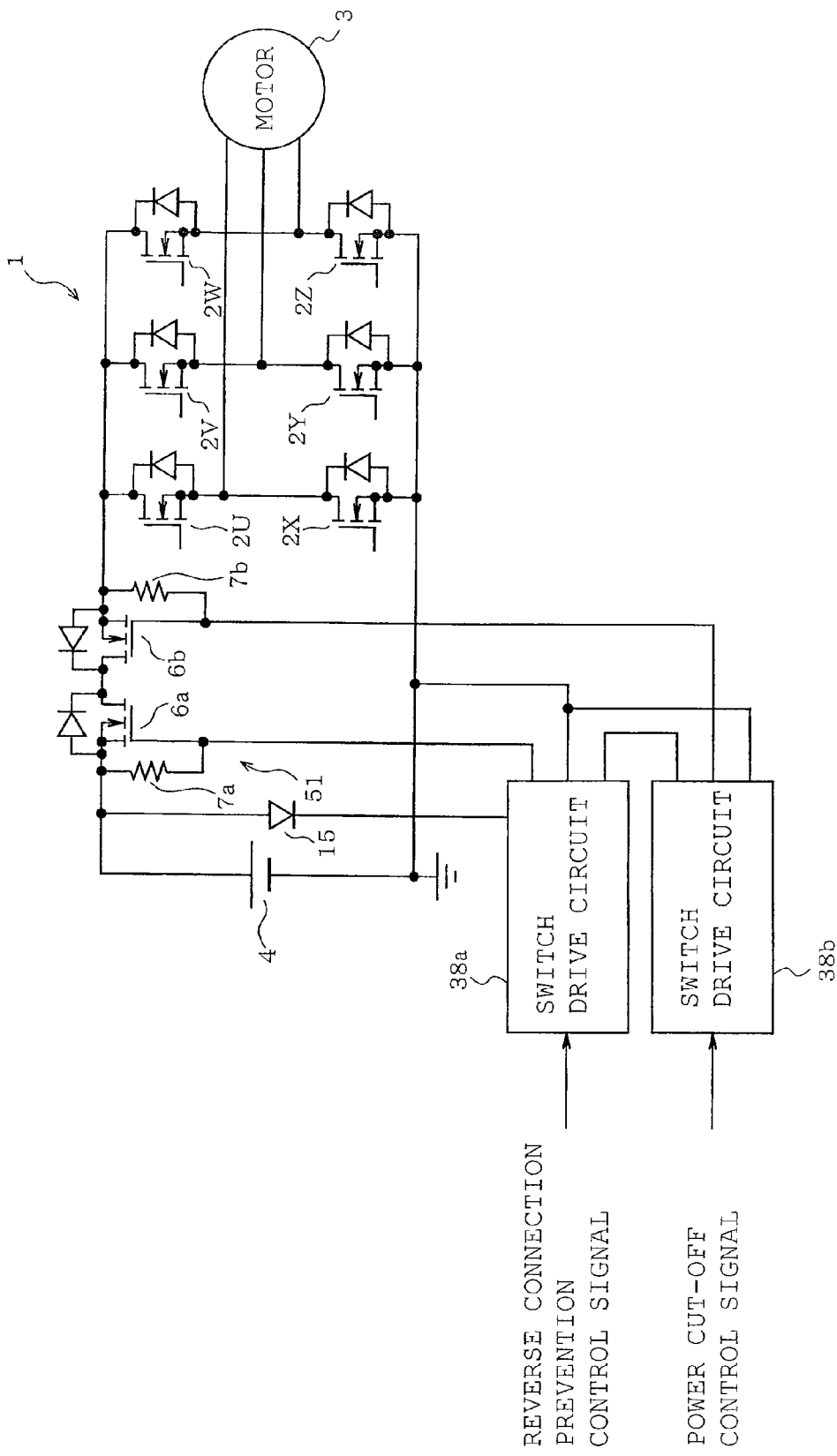
FIG. 10 is a view similar to FIG. 8, showing a fourth embodiment.

FIG. 10 illustrates a fourth embodiment. Only the differences between the third and fourth embodiments will be described. The switch circuit 51 in the fourth embodiment is configured by connecting the drains of the N-channel MOSFETs 16a and 16b in common to each other. In order that the same purpose as in the third embodiment may be achieved in the above-described configuration, the N-channel MOSFET 6b having the anode of the parasitic diode serving as the power supply side is turned off in first, and thereafter the N-channel MOSFET 6a having the anode of the parasitic diode serving as the power supply side is turned off. Accordingly, the fourth embodiment achieves the same effect as the third embodiment when a power supply cut-off control signal is output to the switch drive circuit 38b and the reverse connection prevention control signal is output to the switch drive circuit 38a.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The resistance element 39 may be provided when needed. More specifically, the resistance element 39 may be eliminated when the influences of surge voltage are small.

Further, the resistance element 42 may also be eliminated when the difference between the resistance values at the ON side and the OFF side, that is, the on-off time difference can be sufficiently ensured.

The condition to start the protecting operation should not be limited to detection of an overcurrent. For example, detection of overvoltage or excessive temperature rise may be a condition.

A P-channel MOSFET may be used, instead of the N-channel MOSFET 10. Further, P-channel MOSFETs may be used as the upper arm of the inverter circuit 1.

Current-blocking diodes may be inserted between the source of the N-channel MOSFET 11 and the circuit ground and between the anode of the protecting diode 14 and the circuit ground respectively, instead of the diode 44. Further, the current-blocking diodes may be inserted between the source of the N-channel and the drain of the N-channel MOSFET 11 and between the anode of the protecting diode 13 and the cathode of the protecting diode 14.

The diode 44 may be eliminated when a countermeasure against the reverse connection of the battery 4 is unnecessary.

The control manner in the first or second embodiment may be applied to the switch circuit 51 in the fourth embodiment.

The inverter device should not be limited to the application to the power steering device but is applicable to any device or apparatus including a switch circuit configured by providing an N-channel semiconductor switching element between the DC power supply and an inverter circuit.

The invention claimed is:

1. An inverter device provided with a switch circuit configured by series-connecting two N-channel semiconductor switching elements in opposite directions so that the switch circuit makes or breaks electrical connection between a DC power supply and an inverter circuit, the inverter device comprising:
    a control circuit carrying out a protecting operation in which when the control circuit outputs a control signal to control switching of the inverter circuit and an operating condition is met, the control circuit stops output of the control signal to turn off all switching elements configuring the inverter circuit and the switch circuit; and
    two switch drive circuits connected between the control circuit and the switch circuit to output on-off control signals individually to the respective two N-channel semiconductor elements configuring the switch circuit,
    wherein, in the protecting operation, when the control circuit outputs the on-off control signals to turn off the switch circuit after having stopped output of the control circuit, the control circuit turns off a first one of the two N-channel semiconductor switching elements, the first element having a parasitic diode with a cathode located at a power supply side, the control circuit thereafter turning off the second element, the second element having a parasitic diode with an anode located at a power supply side so that changes in drain-source voltages and drain currents of the N-channel semiconductor switching elements are rendered slower.

2. The inverter device according to claim 1, wherein of the two N-channel semiconductor switching elements configuring the switch circuit, a resistance value adjusting a turn-off time of the second element having the parasitic diode with an anode located at a power supply side is larger than a resistance value adjusting a turn-off time of the first element having the parasitic diode with a cathode located at a power supply side, and
    wherein the first element having the parasitic diode with the cathode located at the power supply side is turned off first and the second element having the parasitic diode with the anode located at the power supply side is thereafter turned off, so that the switch circuit is turned off while a path through which surge voltage is absorbed into the battery is ensured.

3. A power steering device comprising:
    an electric motor generating an assist steering force assisting a steering force of a vehicle steering; and
    an inverter device according to claim 1 and controlling the motor.

* * * * *